(12) United States Patent
Frank (10) Patent No.: US 9,660,708 B1
(45) Date of Patent: May 23, 2017

(54) METHOD AND APPARATUS FOR BEAMFORMING WITH COUPLED ANTENNAS

(71) Applicant: MOTOROLA MOBILITY LLC, Chicago, IL (US)

(72) Inventor: Colin Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/933,499

(22) Filed: Nov. 5, 2015

(51) Int. Cl.
*H04L 27/00* (2006.01)
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC .. H04B 7/0413; H04B 7/0617; H04B 7/0456; H04B 7/0619; H04L 5/0007; H04L 5/03974
See application file for complete search history.

(56) References Cited

U.S. PATENT DOCUMENTS

| 7,457,590 | B2 | 11/2008 | Frank | |
|---|---|---|---|---|
| 8,483,310 | B2 * | 7/2013 | Coldrey | H04B 7/0617 375/259 |
| 8,903,007 | B2 * | 12/2014 | Wang | H04L 25/03974 375/254 |
| 2003/0090422 | A1 * | 5/2003 | Diament | H01Q 1/523 343/700 MS |
| 2009/0252101 | A1 * | 10/2009 | Chen | H04L 5/0007 370/329 |
| 2013/0315328 | A1 * | 11/2013 | Liu | H04B 7/0413 375/267 |

OTHER PUBLICATIONS

J. Wallace, M. Jensen, "Mutual Coupling in MIMO Wireless Systems: A Rigorous Network Theory Analysis," IEEE Transactions on Wireless Communications, Jul. 2004, p. 1317-1325.
H. Steyskal, J. Herd, "Mutual coupling compensation in small array antennas," IEEE Transactions on Antennas and Propagation, Dec. 1990, pp. 1971-1975.

* cited by examiner

*Primary Examiner* — Khanh C Tran
(74) *Attorney, Agent, or Firm* — Matthew C. Loppnow; Watson Intellectual Property Group (57) ABSTRACT

A method and apparatus provide beamforming with coupled antennas. A first channel matrix can be transformed into a transformed second channel matrix. The first channel matrix can be a channel from a transmitter array of antennas of the transmitting device to at least one receiver antenna of a receiving device. A precoding matrix can be determined that maximizes the capacity for the transformed second channel matrix subject to a power constraint of the precoding matrix. The channel capacity maximizing precoding matrix for the transformed second channel matrix can be converted into an optimal precoding matrix for the first channel matrix. A signal can be received for transmission. The optimal precoding matrix can be applied to the signal to generate a precoded signal for transmission over a physical channel. The precoded signal can then be transmitted.

21 Claims, 5 Drawing Sheets

METHOD AND APPARATUS FOR BEAMFORMING WITH COUPLED ANTENNAS

CROSS-REFERENCE TO RELATED APPLICATIONS

This application is related to an application entitled "Method and Apparatus for Equal Energy Codebooks for Antenna Arrays with Mutual Coupling," U.S. application Ser. No. 14/855,693, filed on Sep. 16, 2015, Motorola Mobility docket number MM01601, and commonly assigned to the assignee of the present application, which is hereby incorporated by reference in its entirety.

BACKGROUND

1. Field

The present disclosure is directed to a method and apparatus for beamforming with coupled antennas.

2. Introduction

Presently, wireless communication devices communicate with other communication devices using wireless signals. Many wireless communication devices have multiple antennas that can transmit more focused signals to a receiving device using antenna beamforming. For a transmitter with M antennas transmitting to a receiver with a single antenna, an optimal beamformer maximizes the signal-to-interference ratio at the receiver subject to a constraint on transmit power. The solution for maximizing the signal-to-interference ratio is known as the eigenbeamformer due to the fact that the optimal transmit weights correspond to the eigenvector of a matrix having the largest eigenvalue. While this method is known, the impact of antenna coupling at the transmitter has typically not been considered in the formulation. However, the effect of the antenna correlation must be considered in the formulation of the eigenbeamformer as it affects the computation of the radiated power, and thus the constraint on radiated power.

The effect of mutual coupling has been considered to some extent. U.S. Pat. No. 7,457,590, (issued Nov. 25, 2008), which is hereby incorporated by reference, addresses how to compute the eigenbeamformer as a function of the channel received angular power profile $f(\theta)$ in the case that the antenna pattern $p_k(\theta)$ resulting from each antenna weighting of the form $$u_k = \left[\underbrace{0...0}_{k-1}10...0\right]^T.$$

In "Mutual Coupling in MIMO Wireless Systems: A Rigorous Network Theory Analysis" (Wallace, IEEE, p. 1317-1325, Jul. 4, 2004), which is hereby incorporated by reference, the eigenbeamformer is not explicitly calculated. However, the impact of mutual coupling on the calculation of the radiated power is addressed in computing the MIMO channel capacity in the case of mutual coupling at the transmitter, though only for the case in which the antennas are driven by ideal current sources. Unfortunately, the technique does not address coupled antennas driven by actual sources.

Thus, there is a need for a method and apparatus for improved beamforming with coupled antennas.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for beamforming with coupled antennas. According to a possible embodiment, a first channel matrix H can be transformed into a transformed second channel matrix $P^{-T}_{Source}H$. The first channel matrix H can be a channel from a transmitter array of antennas of the transmitting device to at least one receiver antenna of a receiving device. A precoding matrix W can be determined that maximizes the capacity for the transformed second channel matrix $P^{-T}_{Source}H$ subject to a power constraint of the precoding matrix W. The channel capacity maximizing precoding matrix W for the transformed second channel matrix can be converted into an optimal precoding matrix V for the first channel matrix. A signal can be received for transmission. The optimal precoding matrix V can be applied to the signal to generate a precoded signal for transmission over a physical channel. The precoded signal can then be transmitted.

Figure 1:
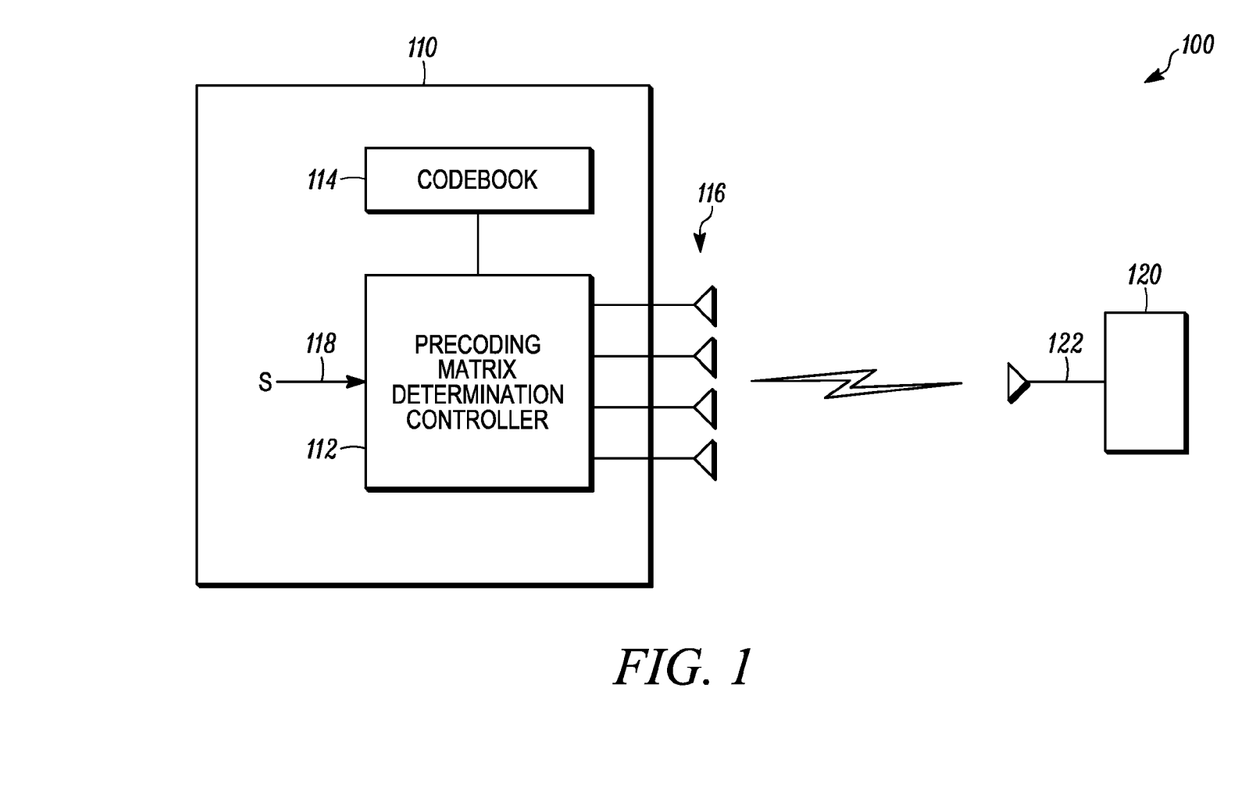
FIG. 1 is an example block diagram of a system according to a possible embodiment.

FIG. 1 is an example block diagram of a system 100 according to a possible embodiment. The system 100 can include a transmitting device 110 and a receiving device 120. The transmitting device 110 can be a User Equipment (UE), a base station, an access point, or any other device that can transmit wireless signals. Similarly, the receiving device 120 can be a UE, a base station, an access point, or any other device that can receive wireless signals. A UE can be a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving wireless communication signals.

The transmitting device 110 can include a precoding matrix determination controller 112, a codebook 114, and an antenna array 116. The precoding matrix determination controller 112 can be one element or can be distributed between different elements. For example, the precoding matrix determination controller 112 can be part of a processor, can be part of a transceiver, can be part of a precoder, can be part of other elements in a transmitting device, and/or can be distributed between combinations of elements in a transmitting device and/or over cloud computing. The receiving device 120 can include at least one antenna 122. For example, in some embodiments the receiving device 120 can have one antenna and in other embodiments the receiving device 120 can have an array of antennas.

In operation, a first channel matrix H can be transformed into a transformed second channel matrix $P^{-T}_{Source}H$. The first channel matrix H can be a channel from a transmitter array of antennas 116 of the transmitting device 110 to at least one receiver antenna 122 of the receiving device 120. A precoding matrix W can be determined that maximizes the capacity for the transformed second channel matrix $P^{-T}_{Source}H$ subject to a power constraint of the precoding matrix W. The channel capacity maximizing precoding matrix W for the transformed second channel matrix can be converted into an optimal precoding matrix V for the first channel matrix. A signal can be received for transmission. The optimal precoding matrix V can be applied to the signal to generate a precoded signal for transmission over a physical channel. The precoded signal can then be transmitted.

For example, embodiments can provide for optimal beamforming with coupled antennas of the antenna array 116 and linear source models. A circuit model can be used to model the mutual coupling of the antennas in order to compute an eigenbeamformer for an arbitrary channel matrix H. As the eigenbeamformer can be a function of the source used to drive the antenna array, the eigenbeamformer can be computed for both Thevenin and Norton source models.

Figure 2:
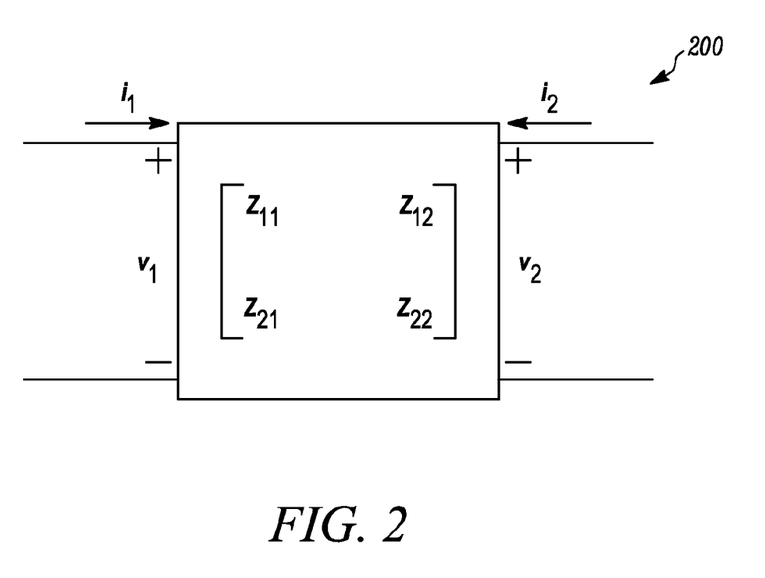
FIG. 2 is an example illustration of a two-port model for a two-element array according to a possible embodiment.

FIG. 2 is an example illustration of a two-port model 200 for a two-element array according to a possible embodiment. The two ports can correspond to two antennas in an antenna array. An M-port circuit can be used to model the vector voltage-current relationship for the M-ports of the M-element antenna array, which can be given by $$V=ZI,$$

where Z can be the M×M impedance matrix for the array. In the two port model 200, $i_1$ and $v_1$ denote the current and voltage for the first antenna, while $i_2$ and $v_2$ denote the current and voltage for the second antenna.

Figure 3:
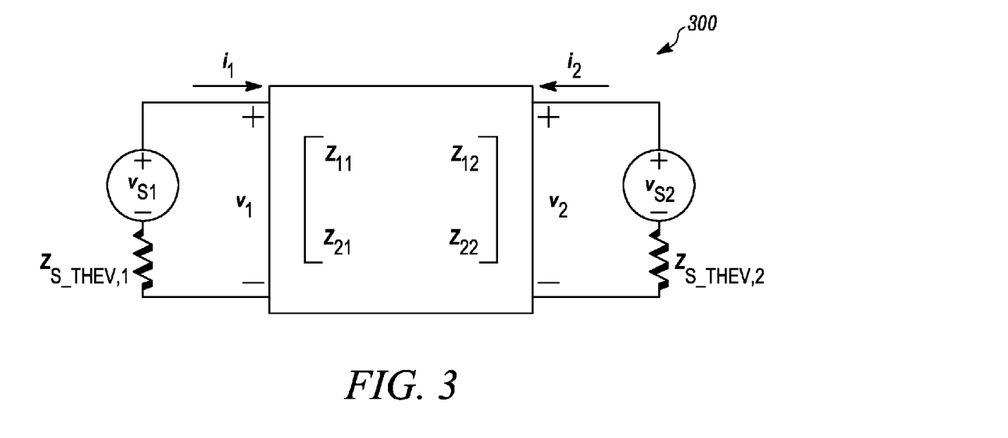
FIG. 3 is an example illustration of a Thevenin source model according to a possible embodiment.
Figure 4:
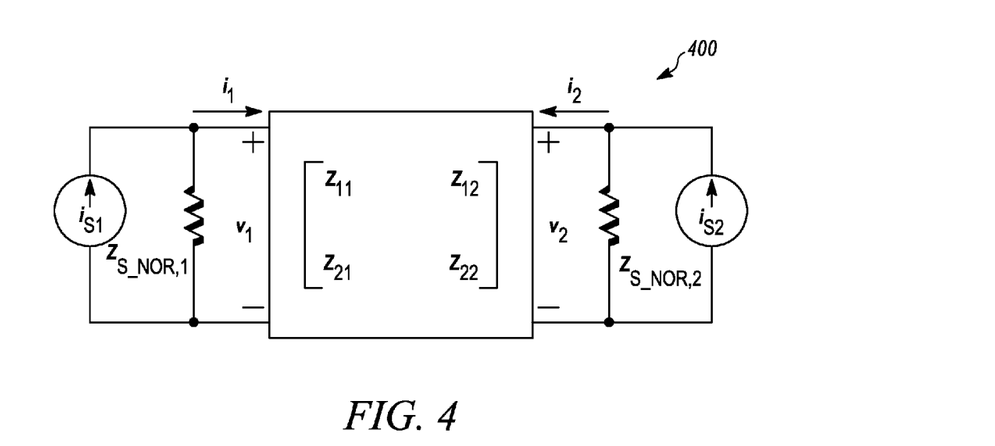
FIG. 4 is an example illustration of a Norton source model according to a possible embodiment.

FIG. 3 is an example illustration of a Thevenin source model 300 according to a possible embodiment. FIG. 4 is an example illustration of a Norton source model 400 according to a possible embodiment. The two linear source models 300 and 400 can be considered for driving an antenna array. The Thevenin source model 300 can include ideal voltage sources $v_S$ in combination with series impedances $Z_{S\_Thev}$, while the Norton source model 400 can include an ideal current source $i_S$ in combination with a parallel shunt impedance $Z_{S\_Nor}$.

The Norton source can yield two-port currents i and voltages v which can be equal to that for the Thevenin source so long as $$Z_{S\_Thev}=Z_{S\_Nor} \text{ and } v_S=Z_{S\_Thev}i_S$$

where $$v_S = \begin{bmatrix} v_{S1} \\ v_{S2} \end{bmatrix} \quad Z_{S\_Thev} = \begin{bmatrix} Z_{S\_Thev,1} & 0 \\ 0 & Z_{S\_Thev,2} \end{bmatrix}$$

and $$i_S = \begin{bmatrix} i_{S1} \\ i_{S2} \end{bmatrix} \quad Z_{S\_Nor} = \begin{bmatrix} Z_{S\_Nor,1} & 0 \\ 0 & Z_{S\_Nor,2} \end{bmatrix}.$$

For an M-element array, the peak radiated power (average power is one-half of peak) can be equal to the power delivered to the M-port device and can be given by $$Re(v^H i)=Re(i^H Z^H i),$$

where Z can be the impedance matrix and i can be the vector of input currents. For the Thevenin source 300 with source voltage $v_S$ and source impedance $Z_{S\_Thev}$, the current vector at the input to the two-port device can be given by $$i=(Z_{S\_Thev}+Z)^{-1}v_S.$$

Thus, the radiated power for the Thevenin source can be given by $$\begin{aligned}P_{rad\_Thev}(v_S, Z_{S\_Thev}, Z) &= Re\big(((Z_{S\_Thev}+Z)^{-1}v_S)^H \\ &\quad Z((Z_{S\_Thev}+Z)^{-1}v_S)\big) \\ &= Re\big(v_S^H(Z_{S\_Thev}+Z)^{-H} \\ &\quad Z(Z_{S\_Thev}+Z)^{-1}v_S\big).\end{aligned}$$

This expression can be further simplified as $$\begin{aligned}P_{rad\_Thev}(v_S, Z_{S\_Thev}, Z) &= \frac{1}{2}\left(\begin{array}{l}v_S^H(Z_{S\_Thev}+Z)^{-H}Z(Z_{S\_Thev}+Z)^{-1}v_S + \\ \left(v_S^H(Z_{S\_Thev}+Z)^{-H}Z(Z_{S\_Thev}+Z)^{-1}v_S\right)^H\end{array}\right) \\ &= \frac{1}{2}\left(v_S^H(Z_{S\_Thev}+Z)^{-H}(Z+Z^H)(Z_{S\_Thev}+Z)^{-1}v_S\right) \\ &= v_S^H((Z_{S\_Thev}+Z)^{-H}Re(Z)(Z_{S\_Thev}+Z)^{-1})v_S \\ &= v_S^H Q_{Thev} v_S\end{aligned}$$

where $$Q_{Thev}=(Z_{S\_Thev}+Z)^{-H}Re(Z)(Z_{S\_Thev}+Z)^{-1},$$

and where for passive linear networks, $$Z=Z^T$$

and thus, $$\frac{Z+Z^H}{2} = \frac{Z+(Z^T)^*}{2} = \frac{Z+Z^*}{2} = Re(Z).$$

For the Norton source model 400 with source currents $i_S$ and source impedance $Z_{S\_Nor}$, the antenna currents can be given by $$i=Z^{-1}(Z_{S\_Nor}^{-1}+Z^{-1})^{-1}i_S,$$

where Z can be the impedance matrix for the array. Assuming that all of the power delivered to the array is radiated (i.e., no ohmic or other losses), the radiated power for the Norton source can be given by $$\begin{aligned}P_{rad\_Nor\_circuit}(i_S, Z_{S\_Nor}, Z) &= Re\big(i_S^H(Z_{S\_Nor}^{-1}+Z^{-1})^{-H}Z^{-H}ZZ^{-1} \\ &\quad (Z_{S\_Nor}^{-1}+Z^{-1})^{-1}i_S\big) \\ &= Re\big(i_S^H Z_{S\_Nor}^H(Z_{S\_Nor}+Z)^{-H} \\ &\quad Z(Z_{S\_Nor}+Z)^{-1}Z_{S\_Nor}i_S\big).\end{aligned}$$

If the Norton source is equivalent to the Thevenin source in the previous section, then $$Z_{S\_Nor}i_S=v_S \text{ and } Z_{S\_Nor}=Z_{S\_Thev}$$

and the radiated power can be given by $$P_{rad\_Nor\_circuit}(i_S, Z_{S\_Nor}, Z) = \text{Re}(i_S^H Z_{S\_Nor}^H (Z_{S\_Nor} + Z)^{-H}$$
$$Z(Z_{S\_Nor} + Z)^{-1} Z_{S\_Nor} i_S)$$
$$= \text{Re}(v_S^H (Z_{S\_Thev} + Z)^{-H}$$
$$Z(Z_{S\_Thev} + Z)^{-1} v_S),$$

which can be the same as for the Thevenin source model 300.

As in the case of the Thevenin source model 300, the expression for radiated power can be simplified as $$P_{rad\_Nor\_circuit}(i_S, Z_{S\_Nor}, Z) = \frac{1}{2} \begin{pmatrix} i_S^H Z_{S\_Nor}^H (Z_{S\_Nor} + Z)^{-H} Z(Z_{S\_Nor} + Z)^{-1} \\ Z_{S\_Nor} i_S + (i_S^H Z_{S\_Nor}^H (Z_{S\_Nor} + Z)^{-H} \\ Z(Z_{S\_Nor} + Z)^{-1} Z_{S\_Nor} i_S)^H \end{pmatrix}$$
$$= \frac{1}{2} (i_S^H Z_{S\_Nor}^H (Z_{S\_Nor} + Z)^{-H} (Z + Z^H)$$
$$(Z_{S\_Nor} + Z)^{-1} Z_{S\_Nor} i_S)$$
$$= i_S^H (Z_{S\_Nor}^H (Z_{S\_Nor} + Z)^{-H} \text{Re}(Z)$$
$$(Z_{S\_Nor} + Z)^{-1} Z_{S\_Nor}) i_S$$
$$= i_S^H Q_{Nor} i_S$$

where $$Q_{Nor} = Z_{S\_Nor}^H (Z_{S\_Nor} + Z)^{-H} \text{Re}(Z) (Z_{S\_Nor} + Z)^{-1} Z_{S\_Nor}.$$

For a transmitter with a Thevenin source and a receiver with a single receive antenna, the M×1 vector $h_{Thev}(Z_{S\_Thev})$ given by $$h_{Thev}(Z_{S\_Thev}) = [h_{Thev,0}(Z_{S\_Thev}) \ldots h_{Thev,k} (Z_{S\_Thev}) \ldots h_{Thev,M-1}(Z_{S\_Thev})]^T$$

can denote the channel observed at the receiver from each transmit antenna from a Thevenin source with series impedance $Z_{S\_Thev}$. More precisely, let $h_{Thev,k}(Z_{S\_Thev})$ denote the channel observed at the receiver when the voltage source vector $$v_k = [\underbrace{0 \ldots 0}_{k-1} 1 0 \ldots 0]^T$$

is applied at the transmitter. The fact that the channel observed at the receiver can depend on the source impedance $Z_{S\_Thev}$ can be due to the fact that the antenna pattern that results when the precoder $v_k$ is applied to the array is given by $$v_k^T (Z_{S\_Thev} + Z)^{-1} p(\theta, \phi),$$

where $$p(\theta, \phi) = [p_1(\theta, \phi), p_2(\theta, \phi), \ldots, p_M(\theta, \phi)]^T,$$

and $p_k(\theta)$ can be the antenna pattern for the k-th antenna element when all of the other elements are removed from the array. For an arbitrary voltage source vector v, the signal y observed at the receiver can be given by $$y = v^T h_{Thev}(Z_{S\_Thev}) + n,$$

where n can denote a zero-mean complex Gaussian random variable with variance $\sigma^2$.

The signal-to-noise ratio at the receiver can then be given by $$\frac{\|E(y)\|^2}{\sigma^2} = \frac{\|v^T h_{Thev}(Z_{S\_Thev})\|^2}{\sigma^2} =$$
$$\frac{v^T (h_{Thev}(Z_{S\_Thev}) h_{Thev}^H(Z_{S\_Thev})) v^*}{\sigma^2} = \frac{v^H (h^*_{Thev}(Z_{S\_Thev}) h_{Thev}^T(Z_{S\_Thev})) v}{\sigma^2}.$$

Thus, the optimal beamformer $v_{opt}$ can maximize $$v^H (h^*_{Thev}(Z_{S\_Thev}) h_{Thev}^T(Z_{S\_Thev})) v$$

subject to the constraint that $$v^H Q_{Thev} v = 1.$$

Since the matrix $Q_{Thev}$ is Hermitian and positive definite, this matrix can be factored as $$Q_{Thev} = P_{Thev}^H P_{Thev}$$

where we refer to $P_{Thev}^H$ and $P_{Thev}$ as the left and right factors of the product.

If we define $$w = P_{Thev} v,$$

it then follows that $$v = P_{Thev}^{-1} w.$$

With this notation, the objective of the beamformer can now be to maximize $$w^H (P_{Thev}^{-1})^H (h^*_{Thev}(Z_{S\_Thev}) h_{Thev}^T(Z_{S\_Thev})) P_{Thev}^{-1} w$$

subject to the constraint that $$w^H w = 1.$$

The solution to this problem is known and can be obtained by setting w $$w = e_{Thev\_max},$$

where $e_{Thev\_max}$ can be the eigenvector corresponding to the largest eigenvalue, $\lambda_{Thev\_max}$, of the matrix $(P_{Thev}^{-1})^H (h^*_{Thev}(Z_{S\_Thev}) h_{Thev}^T(Z_{S\_Thev})) P_{Thev}^{-1}$. The optimal beamformer $v_{opt}$ can then be given by $$v_{opt} = P_{Thev}^{-1} e_{Thev\_max}.$$

The signal-to-noise ratio of the optimal beamformer $v_{opt}$ can be given by $$SNR_{Thev}(v_{opt}) = \frac{\lambda_{Thev\_max}}{\sigma^2}.$$

For the gain of the optimal beamformer relative to that of any other beamformer v for which the radiated power is normalized to unity, the required normalization of v can be given by $$\frac{v}{(v^H Q_{Thev} v)^{1/2}}.$$

The received signal-to-noise ratio for this beamformer can be given by $$SNR_{Thev}\left(\frac{v}{(v^H Q_{Thev} v)^{1/2}}\right) = \frac{v^H(h^*_{Thev}(Z_{S\_Thev})h^T_{Thev}(Z_{S\_Thev}))v}{(v^H Q_{Thev} v)\sigma^2}.$$

Thus, the gain of the optimal beamformer $v_{opt}$ to an arbitrary beamformer v can be given by $$\frac{SNR_{Thev}(v_{opt})}{SNR_{Thev}((v^H Q_{Thev} v)^{-1/2})} =$$

$$\frac{\lambda_{Thev\_max}}{\sigma^2}\left(\frac{v^H(h^*_{Thev}(Z_{S\_Thev})h^T_{Thev}(Z_{S\_Thev}))v}{(v^H Q_{Thev} v)\sigma^2}\right)^{-1} =$$

$$\lambda_{Thev\_max}\frac{v^H Q_{Thev} v}{v^H(h^*_{Thev}(Z_{S\_Thev})h^T_{Thev}(Z_{S\_Thev}))v}.$$

For a transmitter with a Norton source and a receiver with a single receive antenna, let the M×1 vector $h_{Nor}(Z_{S\_Nor})$ given by $$h_{Nor}(Z_{S\_Nor}) = [h_{Nor,0}(Z_{S\_Nor}) \ldots h_{Nor,k}(Z_{S\_Nor}) \ldots h_{Nor,M-1}(Z_{S\_Nor})]^T$$

denote the channel observed at the receiver from each transmit antenna from a Norton source with shunt impedance $Z_{S\_Nor}$. More precisely, let $h_{Nor,k}(Z_{S\_Nor})$ denote the channel observed at the receiver when the current source vector $$i_k = [\underbrace{0\ldots0}_{k-1}10\ldots0]^T$$

is applied at the transmitter. The fact that the channel observed at the receiver depends on the source impedance $Z_{S\_Nor}$ can be due to the fact that the antenna pattern that results when the precoder $i_k$ is applied to the array is given by $$i_S^T(Z_{S\_Nor}^{-1} + Z^{-1})^{-1}Z^{-1}p(\theta,\phi).$$

where $$p(\theta,\phi) = [p_1(\theta,\phi), p_2(\theta,\phi), \ldots, p_M(\theta,\phi)]^T.$$

and $p_k(\theta)$ can be the antenna pattern for the k-th antenna element when all of the other elements are removed from the array. Thus, for an arbitrary current source vector i, the signal y observed at the receiver can be given by $$y = i^T h_{Nor}(Z_{S\_Nor}) + n,$$

where n denotes a zero-mean complex Gaussian random variable with variance $\sigma^2$. The signal-to-noise ratio at the receiver can be then given by $$\frac{\|E(y)\|^2}{\sigma^2} = \frac{\|i^T h_{Nor}(Z_{S\_Nor})\|^2}{\sigma^2} = \frac{i^T(h_{Nor}(Z_{S\_Nor})h^H_{Nor}(Z_{S\_Nor}))i^*}{\sigma^2} = \frac{i^H(h^*_{Nor}(Z_{S\_Nor})h^T_{Nor}(Z_{S\_Nor}))i}{\sigma^2}.$$

Thus, the optimal beamformer $i_{opt}$ can maximize $$i^H(h^*_{Nor}(Z_{S\_Nor})h^T_{Nor}(Z_{S\_Nor}))i$$

subject to the constraint that $$i^H Q_{Nor} i = 1$$

Since the matrix $Q_{Nor}$ is Hermitian and positive definite, this matrix can be factored as $$Q_{Nor} = P_{Nor}^H P_{Nor}$$

where we refer to $P_{Nor}^H$ and $P_{Nor}$ as the left and right factors of the product.

If we define $$w = P_{Nor} i,$$

it then follows that $$i = P_{Nor}^{-1} w.$$

With this notation, the objective of the beamformer can now be to maximize $$w^H(P_{Nor}^{-1})^H(h^*_{Nor}(Z_{S\_Nor})h^T_{Nor}(Z_{S\_Nor}))P_{Nor}^{-1}w$$

subject to the constraint that $$w^H w = 1.$$

The solution to this problem is known and can be obtained by $$w = e_{Nor\_max},$$

where $e_{Nor\_max}$ can be the eigenvector corresponding to the largest eigenvalue, $\lambda_{Nor\_max}$, of the matrix $(P_{Nor}^{-1})^H(h^*_{Nor}(Z_{S\_Nor})h^T_{Nor}(Z_{S\_Nor}))P_{Nor}^{-1}$. The optimal beamformer $i_{opt}$ can then be given by $$i_{opt} = P_{Nor}^{-1} e_{Nor\_max}.$$

The signal-to-noise ratio of the optimal beamformer $i_{opt}$ can be given by $$SNR_{Nor} = (i_{opt}) = \frac{\lambda_{Nor\_max}}{\sigma^2}.$$

When the gain of the optimal beamformer relative to that of any other beamformer i for which the radiated power is normalized to unity, the required normalization of i can be given by $$\frac{i}{(i^H Q_{Nor} i)^{1/2}}.$$

The received signal-to-noise ratio for this beamformer can be given by $$SNR_{Nor}\left((v^H Q_{Nor} i)^{-1/2}\right) = \frac{v^H(h^*_{Nor}(Z_{S\_Nor})h^T_{Nor}(Z_{S\_Nor}))v}{(i^H Q_{Nor} i)\sigma^2}.$$

Thus, the gain of the optimal beamformer $i_{opt}$ relative to an arbitrary beamformer i can be given by $$\frac{SNR_{Nor}(i_{opt})}{SNR_{Nor}((i^H Q_{Thev} i)^{-1/2})} = \frac{\lambda_{Nor\_max}}{\sigma^2}\left(\frac{i^H(h^*_{Nor}(Z_{S\_Nor})h^T_{Nor}(Z_{S\_Nor}))i}{(i^H Q_{Nor} i)\sigma^2}\right)^{-1} =$$

$$\lambda_{Nor\_max}\frac{i^H Q_{Nor} i}{i^H(h^*_{Nor}(Z_{S\_Nor})h^T_{Nor}(Z_{S\_Nor}))i}.$$

For application to Multiple Input Multiple Output (MIMO) capacity optimization, as noted previously, the problem of mutual coupling for MIMO wireless systems has been considered previously by evaluating the capacity of the MIMO channel when the transmitting antennas are coupled and are driven by ideal current sources (i.e., a Norton source with infinite shunt impedance). Embodiments can consider the capacity of the MIMO channel with mutual coupling and general linear source models.

For a Thevenin source model, the MIMO channel can have M transmit antennas and N receive antennas. The M×N channel matrix can be denoted by H, where $H_{i,j}$ can denote the channel observed at the j-th receive antenna when the precoder $v_i$ is applied at the transmitter, where $$v_i = [\underbrace{0...0}_{i-1}10...0]^T.$$

The capacity of this channel subject to a power constraint is known in the case that the transmitted power corresponding to the precoding vector v is given by $$\|v\|_2^2 = v^H v = \sum_{i=1}^{M}|v_i|^2,$$

and also in the case that the transmitted power corresponding to the multi-layer precoding matrix V with L layers can be given by $$\|V\|_2^2 = \sum_{l=1}^{L} V_{:,l}^H V_{:,l} = \sum_{l=1}^{L}\sum_{i=1}^{M}|V_{i,l}|^2.$$

However, this condition is not satisfied in general if the transmitter antennas are coupled.

As discussed above, let Z denote the M×M impedance matrix for the transmit array, and let $Z_{S\_Thev}$ denote the M×M diagonal source impedance. From above, the transmitted power for the precoding vector v can be given by $$v^H Q_{Thev} v = \sum_{i=1}^{M}\sum_{j=1}^{M} v_i^* Q_{Thev\_i,j} v_j,$$

where $Q_{Thev} = (Z_{S\_Thev}+Z)^{-H} Re(Z)(Z_{S\_Thev}+Z)^{-1}$.

Thus, for a multi-layer precoding matrix, the transmitted power can be given by $$\sum_{l=1}^{L} V_{:,l}^H Q_{Thev} V_{:,l} = \sum_{l=1}^{L}\sum_{i=1}^{M}\sum_{j=1}^{M} V_{i,l}^* Q_{Thev\_i,j} V_{j,l}$$

This problem can be solved by transforming it to a similar problem for which the capacity maximization solution is known. As in previous sections, the matrix $Q_{Thev}$ can be factored as $Q_{Thev} = P_{Thev}^H P_{Thev}$ and the vector w can be defined such that $w = P_{Thev} v$.

If the precoder v is applied at the transmitter, the channel observed at the receiver can be given by $v^T H = w^T P_{Thev}^{-T} H = w^T (P_{Thev}^{-T} H)$.

Thus, the precoding vector v that maximizes the capacity of the channel H subject the power constraint $v^H Q_{Thev} v \leq P$ can be given by $v = P_{Thev}^{-1} w$, where w maximizes the capacity of the channel $P_{Thev}^{-T} H$ subject to the constraint $v^H Q_{Thev} v = w^H w \leq P$.

Similarly, for the multi-layer precoding matrix V, a second multi-layer precoding matrix W can be defined such that $W = P_{Thev} V$.

If the multi-layer precoding matrix V is applied at the transmitter, the vector channel observed at the receiver can be given by $V^T H = W^T P_{Thev}^{-T} H = W^T (P_{Thev}^{-T} H)$.

Thus, the multi-layer precoding matrix V which maximizes the capacity of the channel H subject the power constraint $$\sum_{l=1}^{L} V_{:,l}^H Q_{Thev} V_{:,l} \leq P$$

can be given by $V = P_{Thev}^{-1} W$, where the multi-layer precoding matrix W maximizes the capacity of the channel $P_{Thev}^{-T} H$ subject to the constraint $$\sum_{l=1}^{L} W_{:,l}^H W_{:,l} \leq P.$$

Maximizing capacity subject to a power constraint for the case above that the transmitted power corresponding to a multi-layer precoder can be given by $$\sum_{l=1}^{L} W_{:,l}^H W_{:,l},$$

the precoder selection and power allocation which maximizes capacity is known. In particular, for a given precoder W and M×1 input signal vector d, the N×1 received signal vector y can be given by $y = (P_{Thev}^{-T} H)^T W d + n$, where the N×1 vector n can denote a zero-mean complex Gaussian random vector with covariance matrix given by $E(nn^H) = \sigma^2 I_{N \times N}$, where $I_{N \times N}$ can be the identity matrix of dimension N.

The channel matrix $P_{Thev}^{-T}H$ can be expressed in terms of its singular value decomposition as $$P_{Thev}^{-T}H = U\Sigma X^H,$$

where U can be a unitary M×M matrix, Σ can be an M×N rectangular diagonal matrix with non-negative real numbers on the diagonal, and $X^H$ can be a unitary N×N matrix where the superscript H denotes the conjugate transpose of the matrix. The columns of U can be the left singular vectors of $P_{Thev}^{-T}H$, the columns of X can be the right singular vectors of $P_{Thev}^{-T}H$, and the diagonal elements of Σ can be the singular values of $P_{Thev}^{-T}H$. Let $\{\alpha_1, \alpha_2, \ldots, \alpha_K\}$ denote the singular values of $P_{Thev}^{-T}H$ in order from top left to bottom right, where K can be defined as the minimum of the number of antenna elements at the transmitter and the receiver, so that $$K = \min(M, N).$$

Similarly, let $\{u_1, u_2, \ldots, u_M\}$ denote the columns of U in order from left to right, which can be the left singular vectors of $P_{Thev}^{-T}H$, and let $\{x_1, x_2, \ldots, x_N\}$ denote the columns of X in order from left to right, which can be the right singular vectors of $P_{Thev}^{-T}H$.

Now, the real positive value β can be chosen such that $$P = \sum_{i=1}^{K} \max\left(\beta - \frac{\sigma^2}{|\alpha_i|^2}, 0\right),$$

where P can be the constraint on transmit power. Now, define J as the set of indices $\{j_1, j_2, \ldots, j_L\}$, for which $$\beta - \frac{\sigma^2}{|\alpha_{j_i}|^2} > 0,$$

where $0 < L \leq K$. Then the optimal precoder W for the channel $P_{Thev}^{-T}H$ can have rank L, where the L columns of W are the L left singular vectors of $P_{Thev}^{-T}H$ belonging to the set J, so that $$W = [u_{j_1} u_{j_2} \ldots u_{j_L}].$$

For this precoder, the input signal vector d can have dimension L×1, so that $$d = [d_1 d_2 \ldots d_L]^T$$

and the power allocated to the symbol $d_i$ can be given by $$\beta - \frac{\sigma^2}{|\alpha_{j_i}|^2}$$

for $1 \leq i \leq L$. The resulting channel capacity C for the indicated precoder and power allocation can be then given by $$C = \sum_{i=1}^{L} \log_2\left(1 + \frac{|\alpha_{j_i}|^2}{\sigma^2}\left(\beta - \frac{\sigma^2}{|\alpha_{j_i}|^2}\right)\right)$$

$$= \sum_{i=1}^{L} \log_2\left(\frac{\beta}{\sigma^2}|\alpha_{j_i}|^2\right).$$

To summarize, the precoder that maximizes the capacity of the channel H subject to a power constraint P can be given by $$V = P_{Thev}^{-1}W,$$

where W can maximize the capacity of the channel $P_{Thev}^{-T}H$ subject to the same power constraint P. Furthermore, the L columns of W can be the L left singular vectors of $P_{Thev}^{-T}H$ belonging to the set J, so that $$W = [u_{j_1} u_{j_2} \ldots u_{j_L}],$$

where J can be the set of indices $\{j_1, j_2, \ldots, j_L\}$, for which $$\beta - \frac{\sigma^2}{|\alpha_{j_i}|^2} > 0,$$

and the real positive value β can be chosen such that $$P = \sum_{i=1}^{K} \max\left(\beta - \frac{\sigma^2}{|\alpha_i|^2}, 0\right).$$

Finally, the input signal vector d can have dimension L×1, so that $$d = [d_1 d_2 \ldots d_L]^T$$

and the power allocated to the symbol $d_i$ can be given by $$\beta - \frac{\sigma^2}{|\alpha_{j_i}|^2}$$

for $1 \leq i \leq L$, and the resulting channel capacity C for the indicated precoder and power allocation can then be given by $$C = \sum_{i=1}^{L} \log_2\left(1 + \frac{|\alpha_{j_i}|^2}{\sigma^2}\left(\beta - \frac{\sigma^2}{|\alpha_{j_i}|^2}\right)\right)$$

$$= \sum_{i=1}^{L} \log_2\left(\frac{\beta}{\sigma^2}|\alpha_{j_i}|^2\right).$$

From the discussion above, the solution for the Norton source model can be straightforward. If the precoder i is applied at the transmitter, the channel observed at the receiver can be given by $i^T H$. For the Norton source with diagonal source impedance $Z_{S\_Nor}$, we have $$Q_{Nor} = Z_{S\_Nor}^H(Z_{S\_Nor} + Z)^{-H} Re(Z)(Z_{S\_Nor} + Z)^{-1} Z_{S\_Nor}$$

and $$Q_{Nor} = P_{Nor}^H P_{Nor}.$$

If we define $$w = P_{Nor} i$$

then the channel observed at the receiver can be expressed as $$i^T H = w^T P_{Nor}^{-T} H = w^T (P_{Nor}^{-T} H).$$

Thus, the precoding vector i which maximizes the capacity of the channel H subject the power constraint $$i^H Q_{Nor} i \leq P$$

can be given by $$i = P_{Nor}^{-1} w,$$

where w can maximize the capacity of the channel $P_{Nor}^{-T} H$ subject to the constraint $$i^H Q_{Nor} i = w^H w \leq P.$$

Similarly, for the multi-layer precoding matrix I, a second multi-layer precoding matrix W can be defined such that $$W = P_{Nor} I.$$

If the multi-layer precoding matrix V is applied at the transmitter, the vector channel observed at the receiver can be given by $$I^T H = W^T P_{Nor}^{-T} H = W^T (P_{Nor}^{-T} H).$$

Thus, the multi-layer precoding matrix V that maximizes the capacity of the channel H subject the power constraint $$\sum_{l=1}^{L} I_{\cdot,l}^H Q_{Nor} I_{\cdot,l} \leq P$$

can be given by $$I = P_{Nor}^{-1} W,$$

where the multi-layer precoding matrix W can maximize the capacity of the channel $P_{Nor}^{-T} H$ subject to the constraint $$\sum_{l=1}^{L} W_{\cdot,l}^H W_{\cdot,l} \leq P.$$

Figure 5:
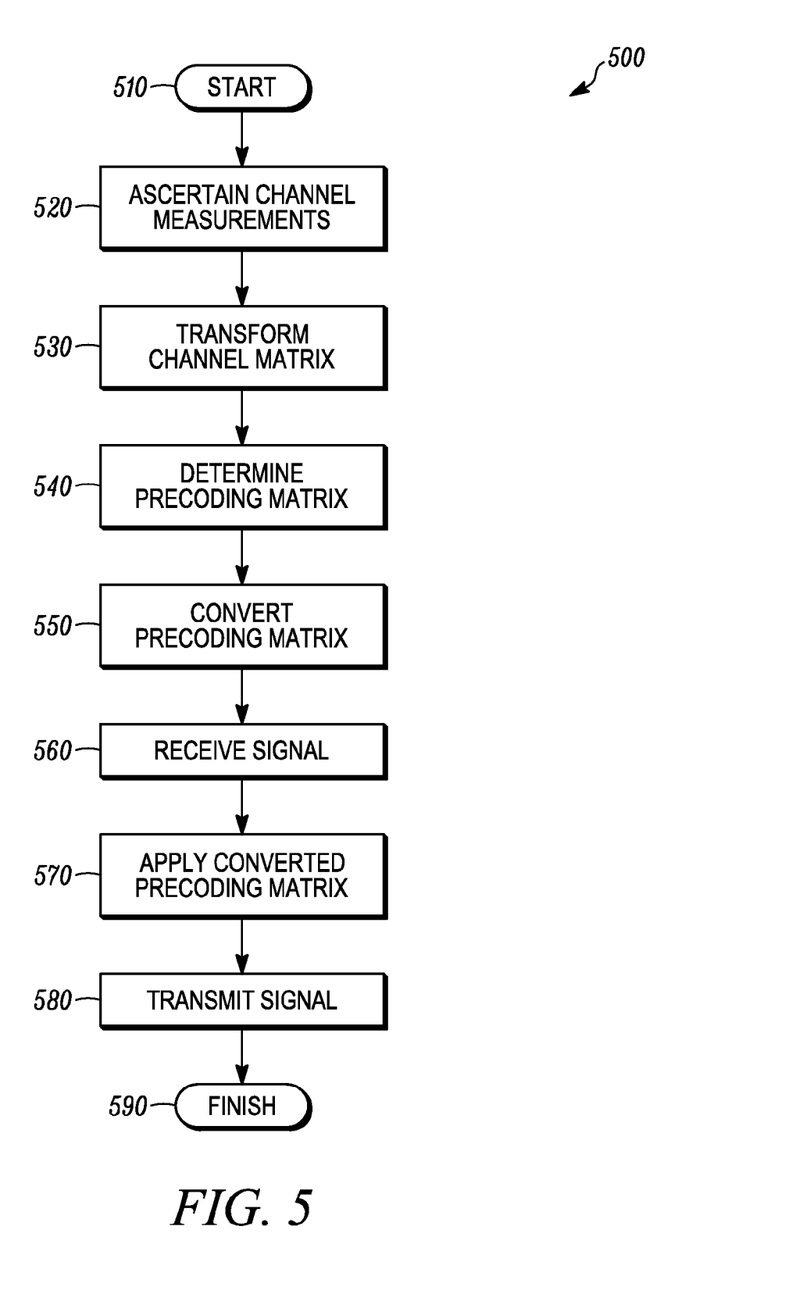
FIG. 5 is an example flowchart illustrating the operation of a transmitting device according to a possible embodiment.

FIG. 5 is an example flowchart 500 illustrating the operation of a transmitting device, such as the device 110 or the device 120, according to a possible embodiment. For example, the method of the flowchart 500 can be performed in a user equipment, in a base station, or in any other device that uses precoders and has a transmitter. At 510, the flowchart 500 can begin. At 520, channel measurements of a channel between a transmitting device and a receiving device can be ascertained. For example, the channel measurements can be made at the transmitting device or the channel measurements can be made at the receiving device and signaled back to the transmitting device.

At 530, a first channel matrix H can be transformed into a transformed second channel matrix $P^{-T}_{Source} H$, where the term "$-T$" can indicate an inverse transpose. The first channel matrix H can be a channel from a transmitter array of antennas of the transmitting device to at least one receiver antenna of the receiving device. The transmitter array of antennas can be mutually coupled in that voltage or current applied to one antenna element can induce a voltage or current on another antenna element in the transmitter array of antennas. The first channel matrix H can be based on the channel measurements of the channel between the transmitting device and the receiving device. For example, the first channel matrix H can be based on channel reciprocity, which can be based on the transmitting device taking measurements of reference symbols transmitted by a target receiving device. The first channel matrix H can also be based on channel measurements taken at the target receiving device and signaled back to the transmitting device.

A transformation matrix $P^{-T}_{Source}$ for the transformation of the second channel $P^{-T}_{Source} H$ can be an inverse transpose of a right factor of a factorization of a Hermitian and non-negative definite matrix. The transformed second channel matrix $P^{-T}_{Source} H$ can be a product of the transformation matrix $P^{-T}_{Source}$ and the first channel matrix H. The Hermitian and non-negative definite matrix can be a function of a source model of the transmitter, a source impedance of a transmitter of the transmitting device, and an impedance matrix of the transmitter array antennas. $P_{Source}$ can be based on $$Q_{Thev} = P_{Source}^H P_{Source},$$

where $$Q_{Thev} = (Z_{S\_Thev} + Z)^{-H} Re(Z)(Z_{S\_Thev} + Z)^{-1},$$

and where $Z_{S\_Thev}$ can be a diagonal matrix of a transmitter source impedances of the transmitting device and Z can be an impedance matrix of the transmitter array antennas. $P_{Source}$ can also be based on $$Q_{Nor} = P_{Source}^H P_{Source},$$

where $$Q_{Nor} = Z_{S\_Nor}^H (Z_{S\_Nor} = Z)^{-H} Re(Z)(Z_{S\_Nor} + Z)^{-1} Z_{S\_Nor},$$

and where $Z_{S\_Nor}$ can be a diagonal matrix of a transmitter source impedances of the transmitting device and Z can be an impedance matrix of the transmitter array antennas.

At 540, a precoding matrix W can be determined that maximizes the capacity for the transformed second channel matrix $P^{-T}_{Source} H$ subject to a power constraint of the precoding matrix W. The precoding matrix can be a one dimensional matrix, such as a vector for a single receive antenna, or can be a multidimensional matrix, such as a two-dimensional matrix for multiple receive antennas. Similarly the channel matrix can be a one dimensional matrix or a multidimensional matrix. Each column vector of the precoding matrix W can be a left singular vector of the transformed second channel matrix $P^{-T}_{Source} H$. A power constraint P on the precoding matrix W can be expressed as $$\sum_{l=1}^{L} W_{\cdot,l}^H W_{\cdot,l} \leq P,$$

where P can denote the power constraint which can be a real positive number and L can be the number of columns in W and can also be the number of transmission layers. $P^{-T}_{Source}$ can be $P^{-T}_{Thev}$, $P^{-T}_{Norton}$, and/or can be based on other models of an antenna array.

At 550, the channel capacity maximizing precoding matrix W for the transformed second channel matrix can be converted into an optimal precoding matrix V for the first channel matrix. An optimal beamformer $v_{opt}$ in the optimal precoding matrix V can be given by $v_{opt} = P_{Thev}^{-1} e_{Thev\_max}$, where $e_{Thev\_max}$ can be the eigenvector corresponding to the largest eigenvalue, $\lambda_{Thev\_max}$, of the matrix $(P_{Thev}^{-1})^H (h^*_{Thev}(Z_{S\_Thev}) h_{Thev}^T (Z_{S\_Thev})) P_{Thev}^{-1}$. An optimal beamformer $i_{opt}$ in the optimal precoding matrix V can also be given by $i_{opt} = P_{Nor}^{-1} e_{Nor\_max}$, where $e_{Nor\_max}$ can be the eigenvector corresponding to the largest eigenvalue, $\lambda_{Nor\_max}$, of the matrix $(P_{Nor}^{-1})^H (h^*_{Nor}(Z_{S\_Nor}) h_{Nor}^T (Z_{S\_Nor})) P_{Nor}^{-1}$.

At 560, a signal can be received for transmission. The signal can be a vector signal. At 570, the optimal precoding matrix V can be applied to the signal to generate a precoded signal for transmission over a physical channel. Columns of the optimal precoding matrix V can include a plurality of precoding vectors. Applying can include multiplying the vector signal by the optimal precoding matrix V to generate a precoded signal vector for transmission over a physical channel. At 580, the precoded signal can be transmitted. At 560, the flowchart 500 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
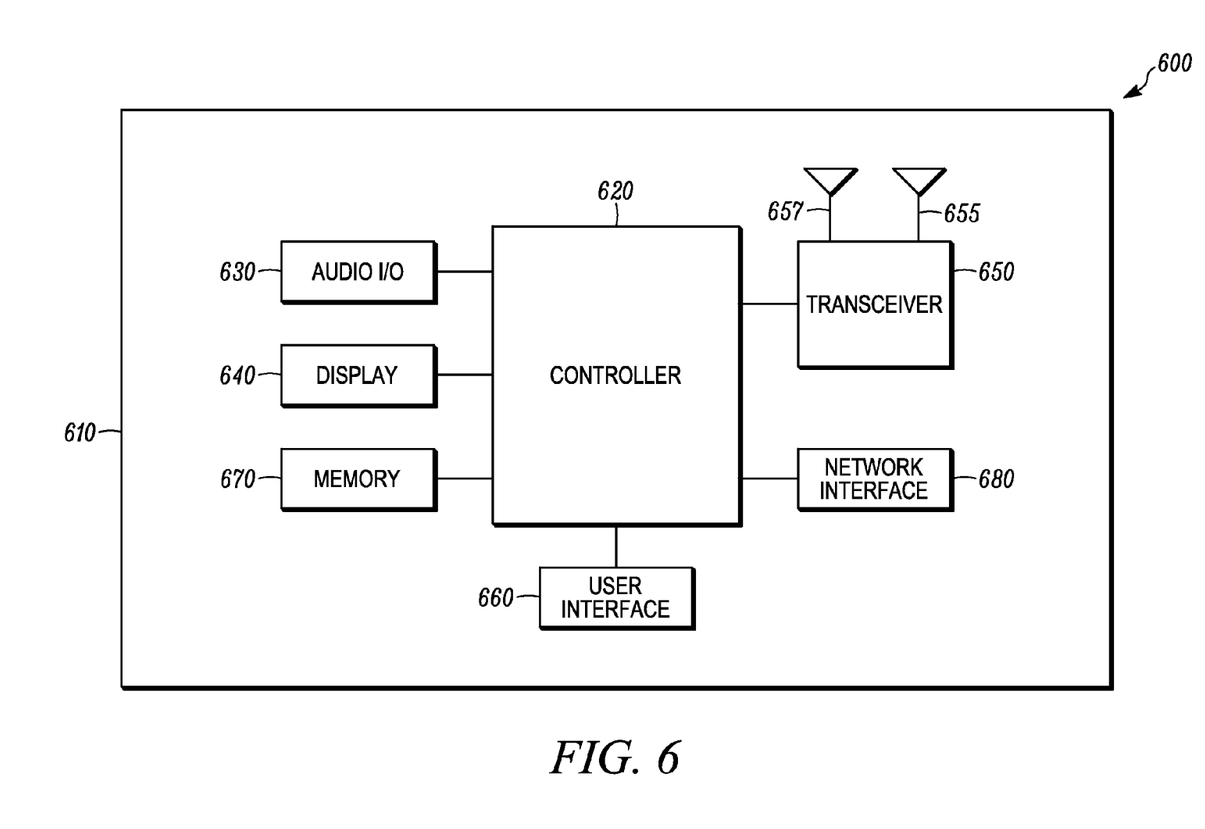
FIG. 6 is an example block diagram of an apparatus according to a possible embodiment.

FIG. 6 is an example block diagram of an apparatus 600, such as the device 110 or the device 120, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, a plurality of antennas 655 and 657, such as an array of antennas, coupled to the transceiver 650, a user interface 660 coupled to the controller 620, a memory 670 coupled to the controller 620, and a network interface 680 coupled to the controller 620. The apparatus 600 can also include additional elements or less elements depending on the device in which it is implemented. The apparatus 600 can perform the methods described in all the embodiments.

The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1396 port, a WLAN transceiver, or any other interface that can connect an apparatus to a network, device, or computer and that can transmit and receive data communication signals. The memory 670 can include a random access memory, a read only memory, an optical memory, a flash memory, a removable memory, a hard drive, a cache, or any other memory that can be coupled to a wireless communication device. The plurality of antennas 655 and 657 can be considered a transmitter array of antennas when the transceiver 650 is transmitting signals. The transmitter array of antennas 655 and 657 can include two or more antennas. The transmitter array of antennas 655 and 657 can be mutually coupled in that one of a voltage and current applied to one antenna element induces a voltage or current on another antenna element in the transmitter array of antennas 655 and 657.

The apparatus 600 or the controller 620 may implement any operating system, such as Microsoft Windows®, UNIX®, or LINUX®, Android®, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating a communication device and implementing the disclosed embodiments.

In operation, the controller 620 can be configured to ascertain channel measurements of a channel between the apparatus 600 and a receiving device. For example, the channel measurements can be ascertained based on channel reciprocity, which can be based on the apparatus 600 taking measurements of reference symbols transmitted by a target receiving device. The channel measurements can also be ascertained based on channel measurements taken at a target receiving device and signaled back to the apparatus 600.

The controller 620 can transform a first channel matrix H into a transformed second channel matrix $P^{-T}_{source}H$. The first channel matrix H can be a channel from the transmitter array of antennas 655 and 657 to at least one receiver antenna of a receiving device. For example, the first channel matrix H can be based on the channel measurements of the channel between the transceiver 650 and the receiving device. A transformation matrix $P^{-T}_{Source}$ for the transformation of the second channel matrix $P^{-T}_{Source}H$ can be an inverse transpose of a right factor of a factorization of a Hermitian and non-negative definite matrix. The transformed second channel matrix $P^{-T}_{Source}H$ can be a product of the transformation matrix $P^{-T}_{Source}$ and the first channel matrix H. The Hermitian and non-negative definite matrix can be a function of a source model of the transmitter of the transceiver 650, a source impedance of the transmitter, and an impedance matrix of the transmitter array antennas 655 and 657. $P_{Source}$ can be based on $$Q_{Thev} = P_{Source}^{H} P_{Source},$$

where $$Q_{Thev} = (Z_{S\_Thev}+Z)^{-H} Re(Z)(Z_{S\_Thev}+Z)^{-1},$$

and where $Z_{S\_Thev}$ can be a diagonal matrix of a transmitter source impedances of the transmitting device and Z can be an impedance matrix of the transmitter array antennas. $P_{Source}$ can also be based on $$Q_{Nor} = P_{Source}^{H} P_{Source},$$

where $$Q_{Nor} = Z_{S\_Nor}^{H}(Z_{S\_Nor}+Z)^{-H} Re(Z)(Z_{S\_Nor}+Z)^{-1} Z_{S\_Nor},$$

and where $Z_{S\_Nor}$ can be a diagonal matrix of a transmitter source impedances of the transmitting device and Z can be an impedance matrix of the transmitter array antennas.

The controller 620 can determine a precoding matrix W that maximizes the capacity for the transformed second channel matrix $P^{-T}_{Source}H$ subject to a power constraint of the precoding matrix W. Each column vector of the precoding matrix W can be a left singular vector of the transformed second channel matrix $P^{-T}_{Source}H$. The controller 620 can convert the channel capacity maximizing precoding matrix W for the transformed second channel matrix into an optimal precoding matrix V for the first channel matrix. Columns of the optimal precoding matrix V can include a plurality of precoding vectors.

The controller 620 can receive a signal for transmission. The signal can be a vector signal. The controller 620 can apply the optimal precoding matrix V to the signal to generate a precoded signal for transmission over a physical channel. The controller 620 can apply the optimal precoding matrix V by multiplying the vector signal by the optimal precoding matrix V to generate a precoded signal vector for transmission over a physical channel. The transceiver 650 can transmit the precoded signal over the physical channel via the transmitter array of antennas.

Some example embodiments above describe a two-port model for a two-element antenna array, and more generally, an M-port model for an M-element antenna array. In these example embodiments, impedance parameters (Z matrix) model the relationship of the voltages and the currents for this two-port, or M-port, antenna array as $$v = Zi.$$

There are also other equivalent parameters that can be used to model the antenna array. For example, other sets of parameters can include admittance parameters (Y), hybrid parameters (H), inverse hybrid parameters (G), ABCD parameters (ABCD), scattering parameters (S), scattering transfer parameters (T), and other parameters useful for modeling an antenna array. All of these models are equivalent, even if they look slightly different. For example, the admittance parameters (Y) can have the voltage -current relationship of $$i = Yv$$

so that $$v = Y^{-1}i$$

and thus $$Z = Y^{-1}.$$

The last expression can give the relationship between the impedance parameters and the admittance parameters. Thus, if the antenna array is represented in terms of its admittance parameters, the precoder transformation may look slightly different, but is still equivalent to the transformation with the impedance parameters. For example, the transformation can be exactly the same with the exact same or similar mapping of a precoder to a transformed precoder, except that Z can be replaced everywhere by $Y^{-1}$, and these can be exactly equal. Similarly, all the other parameters cases above can be converted to Z parameters and are thus equivalent.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. A method in a transmitting device, the method comprising:

transforming a first channel matrix H into a transformed second channel matrix $P^{-T}_{Source}H$, where the first channel matrix H is a channel from a transmitter array of antennas of the transmitting device to at least one receiver antenna of a receiving device, and where a transformation matrix $P^{-T}_{Source}$ is a function of a transmitter source impedance and an impedance matrix of the transmitter array of antennas;

determining a precoding matrix W that maximizes the capacity for the transformed second channel matrix $P^{-T}_{Source}H$ subject to a power constraint of the precoding matrix W;

converting the channel capacity maximizing precoding matrix W for the transformed second channel matrix into an optimal precoding matrix V for the first channel matrix;

receiving a signal for transmission;

applying the optimal precoding matrix V to the signal to generate a precoded signal for transmission over a physical channel; and transmitting the precoded signal.

2. The method according to claim 1, wherein each column vector of the precoding matrix W is a left singular vector of the transformed second channel matrix $P^{-T}_{Source}H$.

3. The method according to claim 1, wherein the transformation matrix $P^{-T}_{Source}$ for the transformed second channel matrix $P^{-T}_{Source}H$ is an inverse transpose of a right factor of a factorization of a Hermitian and non-negative definite matrix.

4. The method according to claim 3, wherein the transformed second channel matrix is a product of the transformation matrix $P^{-T}_{Source}$ and the first channel matrix H.

5. The method according to claim 3, wherein the Hermitian and non-negative definite matrix is a function of a source model of the transmitter, the transmitter source impedance of the transmitting device, and the impedance matrix of the transmitter array of antennas.

6. The method according to claim 3, wherein $P_{Source}$ is based on $$Q_{Thev}=P_{Source}^{H}P_{Source},$$

where $P_{Source}^{H}$ is a left factor of a factorization of a Hermitian matrix $Q_{Thev}$ and $P_{Source}$ is a right factor of a factorization of the Hermitian matrix $Q_{Thev}$, where $$Q_{Thev}=(Z_{S\_Thev}+Z)^{-H}Re(Z)(Z_{S\_Thev}+Z)^{-1}, \text{ and}$$

where $Z_{S\_Thev}$ is a diagonal matrix of the transmitter source impedance of the transmitting device and Z is the impedance matrix of the transmitter array of antennas.

7. The method according to claim 3, wherein $P_{Source}$ is based on $$Q_{Nor}=P_{Source}^{H}P_{Source},$$

where $P_{Source}^{H}$ is a left factor of a factorization of a Hermitian matrix $Q_{Nor}$ and $P_{Source}$ is a right factor of a factorization of the Hermitian matrix $Q_{Nor}$, where $$Q_{Nor}=Z_{S\_Nor}^{H}(Z_{S\_Nor}+Z)^{-H}Re(Z)(Z_{S\_Nor}+Z)^{-1}Z_{S\_Nor},$$
and where $Z_{S\_Nor}$ is a diagonal matrix of a the transmitter source impedance of the transmitting device and Z is the impedance matrix of the transmitter array of antennas.

8. The method according to claim 1,
wherein the signal comprises a vector signal,
wherein columns of the optimal precoding matrix V include a plurality of precoding vectors, and
wherein applying comprises multiplying the vector signal by the optimal precoding matrix V to generate a precoded signal vector for transmission over a physical channel.

9. The method according to claim 1, wherein the transmitter array of antennas are mutually coupled in that voltage or current applied to one antenna element induces a voltage or current on another antenna element in the transmitter array of antennas.

10. The method according to claim 1, further comprising ascertaining channel measurements of a channel between the transmitting device and the receiving device,
wherein the first channel matrix H is based on the channel measurements of the channel between the transmitting device and the receiving device.

11. An apparatus comprising:
a transmitter array of antennas;
a transceiver coupled to the transmitter array of antennas; and
a controller coupled to the transceiver, the controller configured to transform a first channel matrix H into a transformed second channel matrix $P^{-T}_{Source}H$, where the first channel matrix H is a channel from the transmitter array of antennas to at least one receiver antenna of a receiving device, and where a transformation matrix $P^{-T}_{Source}$ is a function of a transmitter source impedance and an impedance matrix of the transmitter array of antennas, determine a precoding matrix W that maximizes the capacity for the transformed second channel matrix $P^{-T}_{Source}H$ subject to a power constraint of the precoding matrix W, convert the channel capacity maximizing precoding matrix W for the transformed second channel matrix into an optimal precoding matrix V for the first channel matrix, receive a signal for transmission, and apply the optimal precoding matrix V to the signal to generate a precoded signal for transmission over a physical channel, wherein the transceiver is configured to transmit the precoded signal over the physical channel via the transmitter array of antennas.

12. The apparatus according to claim 11, wherein each column vector of the precoding matrix W is a left singular vector of the transformed second channel matrix $P^{-T}_{Source}H$.

13. The apparatus according to claim 11, wherein the transformation matrix $P^{-T}_{Source}$ for the transformed second channel matrix $P^{-T}_{Source}H$ is an inverse transpose of a right factor of a factorization of a Hermitian and non-negative definite matrix.

14. The apparatus according to claim 13, wherein the transformed second channel matrix $P^{-T}_{Source}H$ is a product of the transformation matrix $P^{-T}_{Source}$ and the first channel matrix H.

15. The apparatus according to claim 13, wherein the Hermitian and non-negative definite matrix is a function of a source model of a transmitter of the transceiver, the transmitter source impedance, and the impedance matrix of the transmitter array of antennas.

16. The apparatus according to claim 13, wherein $P_{Source}$ is based on $$Q_{Thev}=P_{Source}^{H}P_{Source},$$

where $P_{Source}^{H}$ is a left factor of a factorization of a Hermitian matrix $Q_{Thev}$ and $P_{Source}$ is a right factor of a factorization of the Hermitian matrix $Q_{Thev}$, where $$Q_{Thev}=(Z_{S\_Thev}+Z)^{-H}Re(Z)(Z_{S\_Thev}+Z)^{-1}, \text{ and}$$

where $Z_{S\_Thev}$ is a diagonal matrix of the transmitter source impedance of a transmitter of the transceiver and Z is the impedance matrix of the transmitter array of antennas.

17. The apparatus according to claim 13, wherein $P_{Source}$ is based on $$Q_{Nor}=P_{Source}^{H}P_{Source},$$

where $P_{Source}^{H}$ is a left factor of a factorization of a Hermitian matrix $Q_{Nor}$ and $P_{Source}$ is a right factor of a factorization of the Hermitian matrix $Q_{Nor}$, where $$Q_{Nor}=Z_{S\_Nor}^{H}(Z_{S\_Nor}+Z)^{-H}Re(Z)(Z_{S\_Nor}+Z)^{-1}Z_{S\_Nor},$$
and where $Z_{S\_Nor}$ is a diagonal matrix of the transmitter source impedance of transmitter of the transceiver and Z is the impedance matrix of the transmitter array of antennas.

18. The apparatus according to claim 11,
wherein the signal comprises a vector signal,
wherein columns of the optimal precoding matrix V include a plurality of precoding vectors, and
wherein the controller is configured to apply the optimal precoding matrix V by multiplying the vector signal by the optimal precoding matrix V to generate a precoded signal vector for transmission over a physical channel.

19. The apparatus according to claim 11, wherein the transmitter array of antennas are mutually coupled in that one of a voltage and current applied to one antenna element induces a voltage or current on another antenna element in the transmitter array of antennas.

20. The method according to claim 11,
wherein the controller is configured to ascertain channel measurements of a channel between the transceiver and the receiving device, and
wherein the first channel matrix H is based on the channel measurements of the channel between the apparatus and the receiving device.

21. A method in a transmitting device, the method comprising:
ascertaining channel measurements of a channel between the transmitting device and a receiving device;
transforming a first channel matrix into a transformed second channel matrix, where the first channel matrix is a channel from a transmitter array of antennas of the transmitting device to at least one receiver antenna of the receiving device, where the first channel matrix is based on the channel measurements of the channel between the transmitting device and the receiving device, where the transmitter array of antennas are mutually coupled in that voltage or current applied to one antenna element induces a voltage or current on another antenna element in the transmitter array of antennas, and where a transformation matrix for the transforming is a function of a transmitter source impedance and an impedance matrix of the transmitter array of antennas;
determining a first precoding matrix that maximizes the capacity for the transformed second channel matrix subject to a power constraint of the first precoding matrix;
converting the channel capacity maximizing first precoding matrix for the transformed second channel matrix into a second precoding matrix for the first channel matrix;
receiving a signal for transmission;
applying the second precoding matrix to the signal to generate a precoded signal for transmission over a physical channel; and
transmitting the precoded signal.

* * * * *